United States Patent [19]

Golinelli et al.

[11] Patent Number: 4,524,523

[45] Date of Patent: Jun. 25, 1985

[54] PROBE FOR CHECKING LINEAR DIMENSIONS OF MECHANICAL PIECES

[75] Inventors: Guido Golinelli, Bologna; Carlo Dall'Aglio, Volta Reno Di Argelato, both of Italy

[73] Assignee: Finike Italiana Marposs S.p.A., S. Marino di Bentivoglio, Italy

[21] Appl. No.: 513,309

[22] Filed: Jul. 13, 1983

[30] Foreign Application Priority Data

Mar. 25, 1983 [IT] Italy .................................. 3379 A/83

[51] Int. Cl.³ .............................................. G01B 7/02
[52] U.S. Cl. .................................. 33/143 L; 33/149 J;
33/172 E; 33/560; 33/561
[58] Field of Search ............. 33/143 R, 143 L, 147 R,
33/147 K, 147 L, 147 N, 148 H, 149 J, 172 E,
174 L, 178 E

[56]      References Cited
U.S. PATENT DOCUMENTS

| 2,899,653 | 8/1959  | Capron .............................. 33/172 E |
| 3,122,838 | 3/1964  | Uhlig ................................. 33/172 E |
| 3,180,030 | 4/1965  | Witzke .............................. 33/172 E |
| 3,250,012 | 5/1966  | Hilton et al. ..................... 33/174 L |
| 3,520,063 | 7/1970  | Rethwish et al. ................ 33/169 R |
| 3,750,294 | 8/1973  | Belke et al. ...................... 33/143 L |
| 4,238,886 | 12/1980 | Brown .............................. 33/149 J |
| 4,279,079 | 7/1981  | Gamberini et al. .............. 33/143 L |
| 4,377,911 | 3/1983  | Iida et al. ......................... 33/149 J |
| 4,441,257 | 4/1984  | Golinelli et al. ................. 33/174 L |

FOREIGN PATENT DOCUMENTS 1271841 4/1972 United Kingdom .
2114748 8/1983 United Kingdom .............. 33/178 E

OTHER PUBLICATIONS

"Dimensional Gaging Equipment" by Cleveland Instruments, p. 14, received by Assignee of present appln. in Dec. 1972.

Primary Examiner—Richard R. Stearns
Attorney, Agent, or Firm—Stevens, Davis, Miller & Mosher

[57]     ABSTRACT

A probe for checking linear dimensions of mechanical pieces comprises a support casing, an arm movable with respect to the casing and having a first element, a second element and an intermediate third element, a feeler fixed to the first element of the movable arm for contacting the piece to be checked, and detecting means for providing a signal depending on the position of the movable arm. The intermediate element is removably coupled to the first element and the second element and defines a section adapted to break as a consequence of blows against the feeler and the first element of the movable arm occurring along any direction.

18 Claims, 8 Drawing Figures

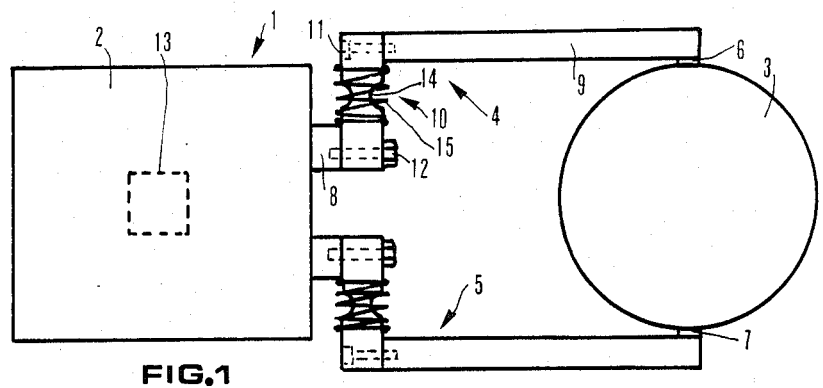
FIG.1
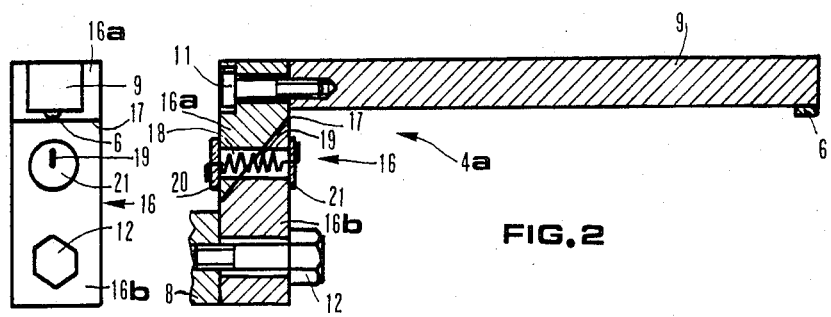
FIG.3
FIG.2
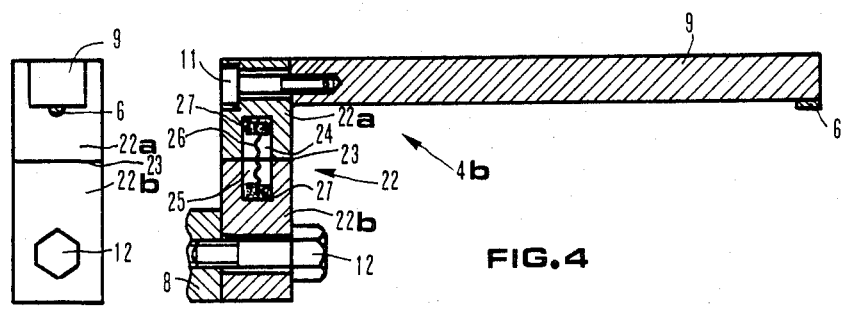
FIG.5
FIG.4

PROBE FOR CHECKING LINEAR DIMENSIONS OF MECHANICAL PIECES

BACKGROUND OF THE INVENTION

1. Field of the Invention

The present invention relates to a probe for checking linear dimensions of mechanical pieces with a support; an arm movable with respect to the support and including a first element, a second element and a third intermediate element connected in a removable way to the first and second elements; a feeler fixed to the first element of the movable arm for contacting a piece to be checked; and detection means adapted for providing a signal responsive to the position of the movable arm; the intermediate element including a section adapted to break while protecting the probe from accidental impacts against the feeler and the first element of the movable arm.

2. Description of the Prior Art

There already are known co-ordinate measuring machines, grinding machines, machining centers, numerically controlled lathes and bench gauges, measuring heads equipped with position transducers and "touch-trigger" type heads, including movable arms provided with safety devices adapted for preventing the occurrence of any irreparable or serious damages to the head, as a result of accidental impacts striking the feeler or the more exposed part of the movable arm. A first type of safety device is disclosed in the sensing head described in British Pat. No. 1 271 841; in this head the movable stylus rod includes two parts connected by a resilient detachable coupling including a disk and balls biased by leaf springs. A sufficiently violent blow, striking along a direction that is perpendicular to the disk axis, causes the detachment of the portion of the stylus rod that carries the disk and the lower edge of the stylus rod. When this occurs, the portion can be engaged again in the operating position. This solution is subject to the inconvenience that a sufficiently accurate, stable and repeatable positioning of the detachable portion of the movable stylus cannot be guaranteed. Moreover, this resilient coupling safety device is not efficacious in the event the lower edge of the stylus is struck along an axial direction of the stylus.

Another type of safety device, employed in the measuring heads disclosed in U.S. Pat. Nos. 3,122,838 and 4,238,886, foresees frictional devices located between two parts of the movable arm. These devices, too, are subject to various inconveniences: they are not efficacious in preventing damage from occurring as a consequence of blows in all the possible striking directions and they can give rise to not easily perceivable zero-setting drifts that may pass unnoticed to the operator, who, consequently, does not take any action and so relies on inexact measurements detected by the measuring head.

A third type of safety device is used in the measuring head described in U.S. Pat. No. 3,250,012. The movable arm or spindle or this head has a reduced neck portion to assure that the spindle will snap as a consequence of at least those impacts striking along transversal directions with respect to the axis of the spindle. The drawbacks of this solution consist in the necessity of replacing, in case of breakage of the neck portion, the whole spindle and in the absence of protection against impacts along the axial direction of the spindle.

A fourth known type of safety device, employed in the gauging head disclosed in U.S. Pat. No. 3,520,063, comprises a sacrificial stud with two ends threaded into two shafts of the movable arm and with an intermediate section where possible breakages occur. This safety device provides advantages like a considerably rigid but sufficiently fragile coupling between the two shafts of the movable arm and allows, in the event of a stud breakage, the resetting of the head efficiency just by replacing the stud. On the other hand the safety stud does not protect against axial loads (directed along the longitudinal axis of the movable arm and of the stud).

SUMMARY OF THE INVENTION

The object of the present invention is to provide a gauging or "touch trigger" head equipped with a safety device that is not affected by any of the previously described inconveniences.

This and other objects and advantages, that will become more apparent from the following detailed description, are reached by a probe of the type outlined at the beginning of the description wherein, according to the invention, the section adapted to break defines a geometrical axis located apart from the feeler and in a substantially different position with respect to the first element of the movable arm, for protecting the probe from blows striking along any direction.

BRIEF DESCRIPTION OF THE DRAWINGS

Some embodiments are now described in detail with reference to the accompanying drawings, given by way of non-limiting examples and in which same or equivalent parts are marked with the same reference numbers.

FIG. 1 is a side view of a gauging head with two feelers for checking linear dimensions,—more specifically diameters of mechanical pieces in the course of a grinding operation—equipped with two safety devices, according to a preferred embodiment for this type of application;

FIG. 2 is a partial longitudinal sectional view with a different scale, of a movable arm of the head of FIG. 1, equipped with a safety device according to a first variant;

FIG. 3 is a lateral view, from right to left, of the movable arm of FIG. 2;

FIG. 4 is a partial longitudinal sectional view with the same scale as that of FIGS. 2 and 3, of a movable arm of the head shown in FIG. 1, equipped with a safety device according to another variant;

FIG. 5 is a lateral view, from right to left, of the movable arm shown in FIG. 4;

DETAILED DESCRIPTION

Figure 6:
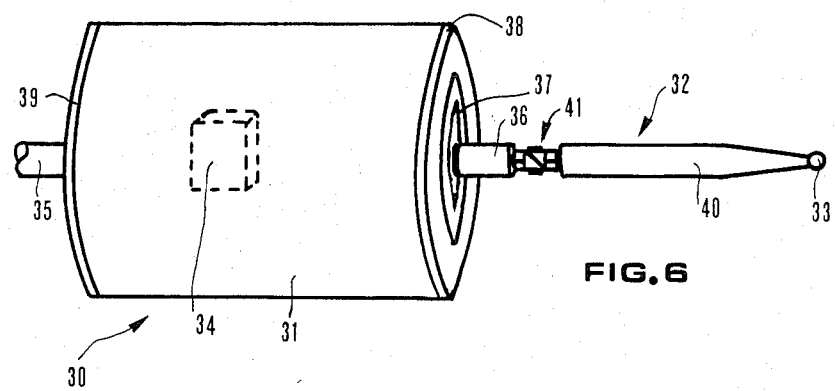
FIG. 6 is a perspective view of a head with a movable arm, specifically for applications on machining centers and numerically controlled lathes, equipped with a safety device that is, at least partially, similar to that of FIGS. 2 and 3.

In FIG. 1 there is shown a probe consisting of a gauging head 1, per se known exception made for the safety device that will be hereinafter described.

Head 1 includes a support casing 2, box-shaped, that is clamped to a slide for carrying head 1 to a measuring position for checking the outside diameter of a piece 3, while the latter is being ground by the grinding wheel of a grinding machine.

The slide, the grinding machine and the grinding wheel are not illustrated in the drawings for the sake of simplicity.

Head 1 has two arms 4 and 5, which are mounted onto casing 2 for pivotal movements and carry, at their ends, feelers 6 and 7 adapted for contacting the surface of piece 3. Movable arms 4 and 5 are alike and consequently just the upper movable arm 4 is described.

Arm 4 includes a first element 8, basically located within casing 2 and pivotally coupled thereto; element 8 passes through a side opening of the casing. The side opening—not shown—is sealed by a flexible gasket, also not shown, which permits rotatory measurement displacements of arm 4. Feeler 6 is fixed to an end of a second element 9 of arm 4; elements 8 and 9—which define two parallel geometrical axes placed at a prefixed distance—are elongated substantially along the longitudinal axis of head 1, i.e. in a substantially perpendicular direction with respect to the displacement direction of feelers 6 and 7.

Arm 4 includes a third element, 10, located between elements 8 and 9 and, like element 9, placed outside casing 2. Element 10 defines a geometrical axis perpendicular to the axes defined by elements 8 and 9 and has an upper end coupled, by means of a screw 11, to the end of element 9 opposite to that which carries feeler 6. The lower end of element 10 is coupled, by means of a screw 12, to the end portion of element 8 outside casing 2. Elements 8, 9 and 10 also include mechanical abutments, not shown, for defining exactly the reciprocal positions of these elements, when they are coupled to one another.

On casing 2 and at the end portions of movable arms 4 and 5, located inside casing 2, there are coupled the elements of one, or two position transducers, schematically shown with a dashed line and marked with reference number 13, that provide a signal representative of the diameter deviation of piece 3 with respect to a reference or nominal valve.

Intermediate element 10 is constructed in such a way as to represent a safety device with respect to any accidental blows against feeler 6 or the more exposed part of movable arm 4, i.e. element 9.

In fact, element 10 has upper and lower sections with rectangular or square cross-sections and an intermediate section, integral with the other two, but with a circular cross-section having a first decreasing and then increasing diameter. The smaller diameter section, 14, forms a weakened section where breakage of arm 4 occurs in the event the previously mentioned blows strike so violently as to be able to cause, in the absence of section 14, considerable or irreparable damages to head 1. Element 10 is made of a negligibly flexible, but rather fragile, material so as to provoke the breakage of section 14 in the event there occur any stresses greater than those that could arise under normal working conditions. At the upper and lower sections of element 10 there are fixed, for example welded, the ends of a helical spring 15 that houses the intermediate section of element 10. Consequently, in the event there occurs the breakage of section 14, element 9 does not fall down, but remains attached to element 8, by means of spring 15, that consequently provides an auxiliary safety device.

In fact, spring 15 prevents element 9 from falling into difficultly accessible or dangerous places, near the grinding wheel or any other movable parts of the grinding machine.

As previously mentioned, and with reference to FIG. 1, it is understood that the safety device efficaciously intervenes whichever be the direction of the forces originated from sudden impacts of feeler 6 or element 9.

In fact, weakened section 14 defines an axis of symmetry, coincident with the geometrical axis of element 10, that is distant from feeler 6 and located in a different position (i.e. perpendicularly) with respect to the axis of element 9.

Whenever the breakage of element 10 occurs, for example, as a consequence of the dropping of a piece 3—in the course of a loading or unloading operation—against element 9, the efficiency of head 1 can be reset in a simple, quick and cheap way, by disassembling the two end sections of element 10 and connecting to elements 8 and 9 a new element 10 with its associated spring 15.

The safety device used in movable arm 4a, shown in FIGS. 2 and 3, includes an intermediate element 16 basically consisting of a bar with a rectangular or square section that is divided into two parts 16a, 16b by a diagonal cut. The two parts 16a and 16b are glued together by means of an adhesive 17 that, since it has negligible resilience but appropriate fragility, defines a breakage section.

This section has a geometrical axis which is inclined with respect to the geometrical axes of elements 8, 9 and 16.

Moreover, intermediate element 16 has a transversal through hole 18 wherein there is housed a return spring 19, the ends of which are coupled to two plates 20 and 21 located at the ends of hole 18. Spring 19 accomplishes functions that are similar to those of spring 15 shown in FIG. 1.

Movable arm 4b, shown in FIGS. 4 and 5, has an intermediate element 22 basically made of a rectangular or square sectioned bar divided in two parts, 22a and 22b, by a cut perpendicular to the axis of the bar. The two parts 22a and 22b are glued together by an adhesive 23 that defines, in this case too, a prefixed breakage section. The two parts 22a and 22b also have two blind axial communicating holes 24 and 25, wherein there is housed a steel wire 26 with ends fixed to parts 22a and 22b by means of adhesive 27. The length of the free section of wire 26 is greater than the length of the corresponding portion of element 22. It is obvious that wire 26 serves as a further safety means, in that it prevents element 9 from falling whenever the breakage of the section defined by adhesive 23 occurs.

The safety device provided by element 22 is also efficacious whichever be the direction of the forces originated by accidental blows striking against feeler 6 or element 9. In fact these forces always give rise to a moment with respect to the center of the section of the cut of element 22.

Head 30, shown in FIG. 6, includes a cylindrical support casing 31 supporting a movable arm 32 carrying, at an end arranged outside casing 31, a feeler 33.

Head 30, with the exception of the safety device, that is hereinafter described, is of a per se known type and can be a gauging head or a contact detecting head (touch trigger probe). Arm 32 can be movable along one, two or three directions, or according to any direction. The displacements of movable arm 32 from a rest position can be measured or, respectively, the moving away of movable arm 32 from the rest position can be detected by means 34 associated with movable arm 32 and casing 31. These means 34, schematically shown with dashed lines, can consist of position transducers, electrical switches, or equivalent devices and provide, depending on the circumstances, one or more signals depending on the position of movable arm 32. Obviously, if head 30 is a touch trigger probe, the signal or signals are of the ON-OFF type.

In the rest position the geometrical axis of movable arm 32 coincides with that of casing 31.

Means 34 are connected by meeans of a cable 35—directly or through wireless couplings (inductive, optical, radiofrequency coupling, ecc)—to a power supply, detection display, and control unit, not shown.

Arm 32 includes a first element 36 that passes through a hole of a sealing diaphragm 37 fixed to the arm and to a ring 38, in turn coupled to an end of casing 31.

A closure plate 39, with a hole for the passage of cable 35, is coupled to the other end of casing 31.

A second element 40 of arm 32 carries feeler 33; element 40 is connected, by means of an intermediate element—consisting of a substantially cylindrical stud 41—, with element 36. Elements 36 and 40 and stud 41 have the same geometrical axis, coinciding with that of arm 32.

Figure 7:
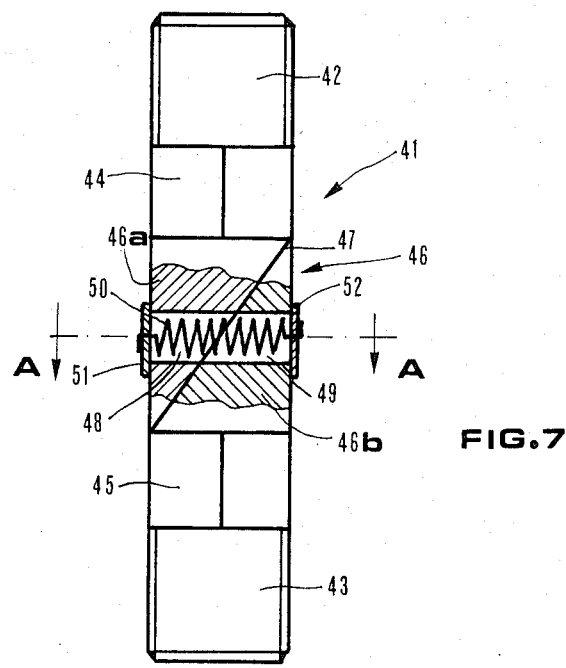
FIG. 7 is a longitudinal view, partly in section, of the safety device of FIG. 6.
Figure 8:
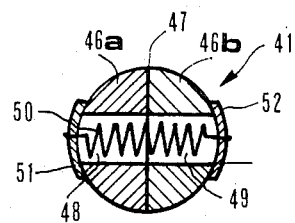
FIG. 8 is a horizontal sectional view of the safety device of FIG. 7, along line A—A in FIG. 7.

Stud 41, as shown in FIGS. 7 and 8, includes two threaded ends 42 and 43—that can be screwed into associated threaded holes of elements 36 and 40—, two chamfered sections 44 and 45—that define seats for the insertion of a tool or key for locking stud 41 to elements 36, 40—and an intermediate section 46.

Intermediate section 46 is divided in two portions 46a and 46b by a diagonal cut that defines two elliptical sections of the intermediate section 46. The two portions 46a and 46b are coupled to each other by means of a joint 47 obtained by spreading an adhesive or glue between the two elliptical sections.

The glue or adhesive is chosen so as to guarantee a negligibly resilient, but fragile connection, so as to allow the detaching of sections 46a and 46b whenever feeler 33 or element 40 is accidentally struck with a force that could damage elements 36, 40 or the elements of head 30 located inside casing 31.

In portions 46a and 46b there are defined two transversal, aligned through holes, 48 and 49, that house a return helical spring 50, the ends of which are coupled to two plates 51 and 52 that are urged by spring 50 against the external surface of intermediate section 46.

Under normal working conditions, stud 41 of head 30 acts as a rigid member, since the material of the stud and the adhesive are chosen so as to have negligible resilience. As a consequence of abnormally violent blows striking against feeler 33 or element 40, that give rise to forces in any direction whatsoever, the adhesive connecting portions 46a and 46b suddenly yield so allowing the disjunction of these portions.

Spring 50, which is a return spring and consequently tends to urge the two portions 46a and 46b one against the other, so compressing the adhesive, remains operative after the breakage of the adhesive, thus preventing the fall of element 40—that remains joined to element 36.

After the breakage of stud 41, its two ends can be unscrewed—by means of a key—from elements 36, 40 and the integrity of movable arm 32 can be reset by repairing stud 41, or by fitting a new stud. The new stud can be coupled first to element 40 and then to element 36 by using the same previously employed key.

In the event the environmental working conditions of head 30 foresee coolants, or other liquids required for cutting operations, that can detrimentally affect the adhesive joining portions 46a and 46b, on the external surface of joint 47 there can be spread a suitable type of paint or protective enamel. The same precaution can obviously be taken for the safety devices shown in FIGS. 2, 3 and 4, 5.

It is important to realize that connecting joint 47 is asymmetric with respect to the axis of stud 41: it defines a geometrical axis that is inclined with respect to the axes of stud 41, of element 36 and of element 40; this axis passes at a defined distance (different from zero) from feeler 33. Consequently, joint 47 accomplishes its function even in the presence of axial loads, i.e. when there occur impacts generating forces acting along the geometrical axis of stud 41. In fact, these impacts generate cutting forces in joint 47.

It is obvious that in the event the heads shown in FIGS. 1 to 8 are arranged in positions where the falling of the elements of the movable arms carrying the feelers cannot cause significant inconveniences, there is no need to use safety devices equipped with additional safety means such as springs 15, 19 or 50, or wire 26.

Another variant consists in foreseeing in every safety device two or more sections or joints subjected to safety breakage.

It is also obvious that the described embodiments can undergo other modifications or variants equivalent from a functional or structural point of view without departing from the scope of the invention.

What is claimed is:

1. A probe for checking linear dimensions of mechanical pieces, comprising: a support; an arm movable with respect to the support and including a first element, a second element and a third intermediate element connected in a removable way to the first and second elements; a feeler fixed to the first element of the movable arm for contacting a piece to be checked; and detection means adapted for providing a signal responsive to the position of the movable arm; wherein said intermediate element includes a breakable section for protecting the probe from accidental impacts against the feeler and the first element of the movable arm, said section defining a geometrical axis located apart from the feeler and in a substantially different position with respect to the first element of the movable arm, for protecting the probe from blows striking along any direction.

2. The probe according to claim 1, wherein said intermediate element includes two distinct portions connected by means of a joint provided by an adhesive, the joint defining the breakable section.

3. The probe according to claim 2, wherein said joint has an external surface coated with a protective paint.

4. The probe according to claim 1, further comprising an auxiliary safety device providing a connection between said first and said second element of said movable arm, the auxiliary safety device being adapted for remaining operative after the breakage of said section.

5. The probe according to claim 4, wherein said auxiliary safety device includes a spring adapted for maintaining the first and the second element of the movable arm connected to each other.

6. The probe according to claim 4, wherein said auxiliary device includes a connection wire adapted for keeping the first and the second element of the movable arm connected to each other.

7. The probe according to claim 1, wherein said intermediate element of the movable arm defines a geometrical axis, this axis being inclined with respect to the geometrical axis defined by the breakable section.

8. The probe according to claim 1, wherein said intermediate element is connected to the first and the second elements of the movable arm by means of threaded connections.

9. The probe according to claim 8, wherein said intermediate element includes a stud having two seats for a tool, for connecting and disconnecting the stud with respect to the first and the second elements of the movable arm.

10. A gauging head for checking diameters of mechanical pieces, comprising: a casing; two arms coupled to the casing, each arm including a first element arranged outside the casing, a second element movably coupled to the casing and a third element intermediate to the first element and the second element and removably connecting the first element and the second element to each other; two feelers respectively fixed at relevant ends of the first elements of the two arms for contacting the piece to be checked; and transducer means adapted to provide a signal representative of the diameter of the piece; wherein each intermediate element includes a breakable section for protecting the gauging head from accidental impacts against the feeler and the first element of the relevant arm, said section defining a geometrical axis located apart from this feeler and from this first element.

11. The gauging head according to claim 10, further comprising two connection elements respectively coupled to said arms for maintaining connected with one another the first and the second element of each arm after breakage of the relevant breakable section.

12. The gauging head according to claim 10, wherein each intermediate element basically consists of an integral member having a weakened portion defining said breakable section.

13. The gauging head according to claim 10, wherein each of said first, second and third elements defines a relevant geometrical axis, the geometrical axis defined by each of the intermediate elements being inclined with respect to the axes defined by the first element and second element connected to this intermediate element.

14. The gauging head according to claim 10, wherein each intermediate element comprises two portions joined together by an adhesive, the adhesive defining said breakable section.

15. A probe for performing measurements on a piece, comprising: a casing; an arm movably coupled to the casing, said arm including a first element arranged outside the casing, a second element partially arranged within the casing and a third element removably connecting said first element to said second element, said first element and said second element defining substantially a common geometrical axis; a feeler fixed at a free end of said first element for contacting the piece; and detecting means for detecting the displacement of the arm from a reference position; wherein said third element includes a breakable section for protecting the probe from accidental impacts suffered by said feeler or said first element, said section defining a geometrical axis lying substantially in a position different from that of said common geometrical axis.

16. A touch probe for detecting contact with a piece, comprising: a casing; an arm movably coupled to the casing, said arm including a first element arranged outside the casing, a second element partially arranged within the casing and a third element removably connecting said first element to said second element; a feeler fixed at a free end of said first element; and detecting means for detecting the displacement of said arm from a reference position; wherein said third element includes a breakable section for protecting the probe from accidental impacts suffered by said feeler or said first element, said section defining a geometrical axis located apart from said feeler and wherein said first element, said second element and said third element define a common geometric axis passing through said feeler.

17. The touch probe according to claim 16, wherein said third element comprises two portions joined together by an adhesive, the adhesive defining said breakable section.

18. A touch probe for detecting contact with a piece, comprising: a casing; an arm movably coupled to the casing, said arm including a first element arranged outside the casing, a second element partially arranged within the casing and a third element removably connecting said first element to said second element; a feeler fixed at a free end of said first element; and detecting means for detecting the displacement of said arm from a reference position; wherein said third element includes a breakable section for protecting the probe from accidental impacts suffered by said feeler of said first element, said section defining a geometrical axis located apart from said feeler, and wherein said touch probe further comprises connection means adapted to maintain said first and said second element loosely connected together after breakage of said section.

* * * * *